United States Patent [19]
Kikuchi

[11] Patent Number: 6,078,562
[45] Date of Patent: *Jun. 20, 2000

[54] DISK CARTRIDGE ARRANGEMENT

[75] Inventor: Shuichi Kikuchi, Miyagi, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/796,620

[22] Filed: Feb. 7, 1997

[30] Foreign Application Priority Data

Feb. 9, 1996 [JP] Japan ..................................... 8-022917

[51] Int. Cl.$^7$ ....................................................... G11B 5/02
[52] U.S. Cl. ............................................................. 369/291
[58] Field of Search ..................................... 369/291, 292, 369/77.2; 360/133, 128, 132; 220/4.21, 4.24, 796, 797; 206/308.3, 309.9, 307.1, 454

[56] References Cited

U.S. PATENT DOCUMENTS

| | | | |
|---|---|---|---|
| 4,639,813 | 1/1987 | Uno ......................................... | 360/128 |
| 4,826,005 | 5/1989 | Tajima et al. ............................ | 206/310 |
| 4,868,699 | 9/1989 | Kingsbury et al. ...................... | 360/128 |
| 4,943,880 | 7/1990 | Muehlhausen et al. ................. | 360/133 |
| 5,048,008 | 9/1991 | Haruna .................................... | 369/291 |
| 5,326,608 | 7/1994 | Ikebe et al. .............................. | 428/65 |
| 5,475,674 | 12/1995 | Yamashita et al. ...................... | 369/291 |
| 5,793,742 | 8/1998 | Sandell et al. ........................... | 369/291 |

FOREIGN PATENT DOCUMENTS

0237690  11/1985  Japan ..................................... 360/133

Primary Examiner—Stuart S. Levy
Assistant Examiner—Tod Kupstas
Attorney, Agent, or Firm—Frommer Lawrence & Haug, LLP.; William S. Frommer

[57] ABSTRACT

A disk cartridge includes a cartridge casing comprised of upper and lower shells attached along the peripheral edges thereof so as to define a disk receiving space within the cartridge casing. The casing structure is formed with an insert opening for allowing a data disk to be easily inserted into an operating position within the assembled cartridge casing. A slide area which may be formed as a recessed surface portion, or the like, is defined at corresponding outer peripheral portions of the upper and lower shells. A disk access opening is formed in the casing shells at a location within the slide area for allowing a head portion of a disk drive to perform read and write operations to the disk. A slidable shutter is mounted astride the upper and lower shells at and edge of the cartridge casing, within the slide area. The shutter portion maybe biased by a spring, or the like so as to normally close the disk access opening while being slidably movable so as to open the disk access opening during disk operation. The cartridge structure further includes a cover portion including a hinge formed on one or both of the casing shells. The cover is openably and closably enabled via the hinge and includes locking means so as to securely close the cartridge casing in a closed position of the cover. According to this, a data disk may be rotatably installed within the cartridge casing in a separate step after assembly of the cartridge casing. As a result of this structure, quality control is also simplified. Accordingly, manufacturing defects are minimized and overall costs and reduced. In addition, waste generated by disposal of defective products is reduced.

20 Claims, 11 Drawing Sheets

DISK CARTRIDGE ARRANGEMENT

BACKGROUND OF THE INVENTION

The present invention relates to a disk cartridge. Specifically, the present invention relates to a data disk cartridge utilized for data storage and the like having an openable cover portion formed in a cartridge casing thereof through which a data disk may be inserted into or removed from the cartridge.

DESCRIPTION OF THE RELATED ART

As is well known, data disk cartridges are widely used for storage of data which is written to the disk and/or read from the disk via a head portion of a disk drive into which the disk is inserted. According to such use, it is important the the data disk, such as, for example, an optical or magneto-optical type data disk, is rotatably mounted within a disk cartridge in a secure and stable manner so as to prevent occurence of errors during data reading and/or writing operations.

Generally, most conventional disk cartridges are manufactured such that the rotatably mounted data disk is positioned between upper and lower shells of a cartridge casing which are then attached via adhesive, ultrasonic welding or other such technique. However, according to this method, it is imperative that the data disk portion and the cartridge casing components are assembled together in the same process. Accordingly, the potential for defects during manufacturing is raised since a flaw in either of the data disk, or the casing components requires that the entire product be considered defective. Thus, manufacturing reliability and product consistency are degraded and overall costs are increased.

Alternatively, there have been proposed disk cartridge structures including an opening provided in the cartridge casing by which a data disk portion may be freely inserted after the casing has been assembled in a separate process. One such conventional disk cartridge structure is disclosed for example in U.S. Pat. No. 5,048,008.

The structure of this previously disclosed disk cartridge will be described hereinbelow with reference to FIGS. 17 and 18.

Figure 17:
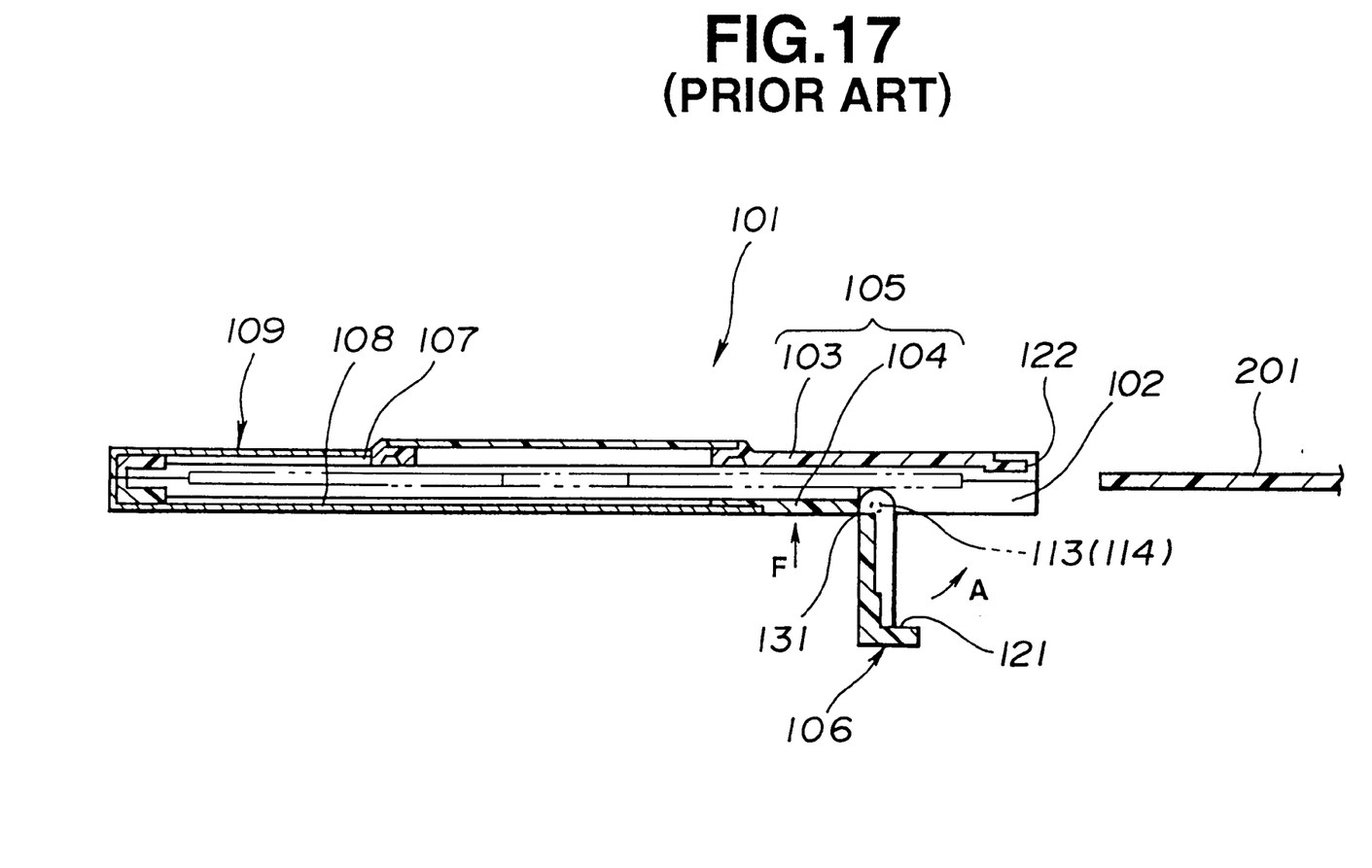
FIG. 17 is a cross-sectional view of a disk cartridge according to the conventional art.

Referring to FIG. 17, a cross-sectional view of the conventional disk cartridge structure is shown. As may be seen, the conventional disk cartridge 101 is so constructed as to allow a data disk 201 to be inserted into the cartridge casing 105 via an disk opening 102. The disk opening 102 is accessed according by a cover member 106 which is pivotally mounted along one side of the cartridge casing 105 so as to open and close the disk opening 102. The cartridge casing 105 is comprised of an upper shell 103 and a lower shell 104 which are affixed to each other at peripheral wall portions thereof. At upper and lower inner surfaces of the upper and lower shells 103, 104, upper and lower slide surface portions 107, 108 are respectively installed. A shutter 109 is slidably mounted over the slider surfaces at a side of the cartridge casing opposite to the disk opening.

Figure 18:
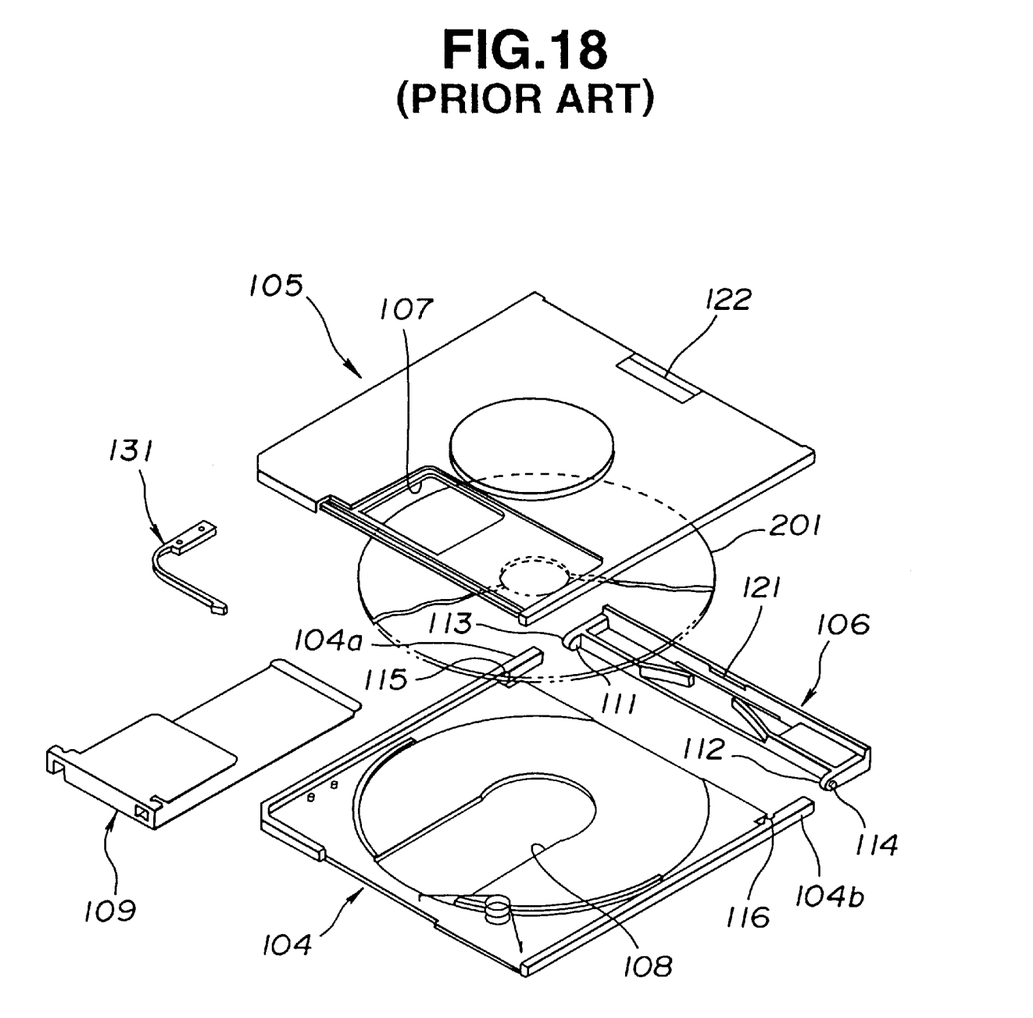
FIG. 18 is an exploded perspective view of the conventional disk cartridge of FIG. 17.

Referring now to FIG. 18, an exploded perspective view of the conventional cartridge is shown. As may be seen, the cover member 106 is pivotally mounted via projecting arm portions 111, 112 at left and right sides of the inner edge of the cover member 106. The arm portions 111, 112 have mounting pins 113, 114 projected from an outer side thereof respectively. The mounting pins 113, 114 engage corresponding recessed portions 115, 116 which are formed on facing inner surfaces of secondary arm portions 104a, 104b projected from left and right sides of the lower shell 104 in the direction at which the cover member 106 is mounted to the cartridge casing 105.

Referring again to FIG. 17, is may be seen that the cover member 106 is pivotally movable in a counter clockwise direction (arrow A in FIG. 17) to open the cartridge casing 105 for allowing insertion of the disk 201. The shutter 109 fits astride the upper and lower shells 103, 104 and fits within the recessed outer surface area defined by the slide surface portions 107, 108. The shutter 109 is normally biased in a closed position via a shutter spring 131.

There are however, several disadvantages to the related art as disclosed. These include increased costs since the cover member and the cartridge casing must be separately manufactured and then joined together in an additional processing step. Thus cost and labor for making such a disk cartridge are increased.

Also, since the projected arm portions 112, 113, 104a, 104b are quite small they may easily be broken or damaged during manufacture or normal use. Thus, reliability of the disk cartridge is degraded and the possiblity of exposure of disk surface is present which may lead to loss of data, error, or irrepairable damage to the data disk itself.

According to the conventional structure, the spring 131 and the hinge structure are both provided on the lower shell 104 increasing the potential for misalignment or faulty operation of this component. In an open condition of the cover portion 106, pressure is exerted in an upward direction towards the upper shell 103 (arrow F in FIG. 17) and the risk of portions of the cartridge casing coming into contact with the surface of the disk 201 is unfavorably increased.

And, since the dimensions of the actual disk opening 102 defined in an open condition of the cover member 106 is relatively small, great care must be taken during installation and/or removal of the disk, since contacting the disk against the structure of the cartridge casing during such operation may easily damage the disk. Thus, manufacture and use of the disk becomes complex.

The present invention seeks to provide a disk cartridge structure having a cover portion which is openable and closable such that a data disk may be easily removed from and installed into the cartridge.

Further, the invention seeks to assure that such a data disk may be inserted into the cartridge in such a manner that correct mounting of the installed disk and reliable disk operational performance is reliably achieved without undue occurence of operational error.

In addition, it has been required to provide such a data disk cartridge having a simplified structure and which may be reliably manufactured and assembled at comparatively low cost.

SUMMARY OF THE INVENTION

Thus, it is an object of the present invention to overcome the drawbacks of the related art.

It is a further object of the invention to provide a disk cartridge having a cover portion which is openable nd closable such that a data disk may be easily removed from and installed into the cartridge.

It is also and object of the invention to provide a disk cartridge structure in which a data disk inserted into the cartridge is correctly mounted in simple fashion such that reliable disk operation is reliably.

According to one aspect of the invention, there is provided a disk cartridge,having a cartridge casing with a first opening defined therein by which a disk may be inserted into a operating position within the casing. A slide area is defined in an outer peripheral portion of the upper and lower shell portions of the casing with a second, disk access opening defined between upper and lower shell portions within the slide area. A slidably disposed shutter is provided at an edge of the casing so as to be movable within the slide area so as to allow opening and closing of the disk access opening. A hinge is provided on at least one of the upper and lower shell portions so as to allow access to the first opening in an open position thereof, and to close the first opening in a closed position thereof such that a data disk, or the like may be installed into or removed from the disk cartridge after assembly of the cartridge casing.

According to another aspect of the invention, there is provided a data disk cartridge including an upper casing shell and a lower casing shell. The upper and lower casing shells are attached at edge portions thereof so as to form a cartridge casing having a hollow space defined therebetween which is configured for enabling a disk to be rotatably mounted therein. A recessed slide area is defined in an outer peripheral portion of the upper and lower casing shells having a disk access opening formed therewith in. A shutter is slidably mounted astride a peripheral edge of the cartridge casing within the slide area so as to open and close the disk access opening according to disk operation. The cartridge casing includes a cover member including a hinge provided on at least one of the upper and lower shells. The cover member is movable according to pivotal movement thereof along the hinge so as to open or close the cartridge casing for allowing access to the hollow space within the cartridge casing. A data disk is provided which may be inserted into or removed from the cartridge casing in an open condition of the cover member. The data disk is so configured as to be rotatably mounted within the hollow space defined between the upper and lower shells in a closed condition of the cover member.

DESCRIPTION OF THE PREFERRED EMBODIMENT

Hereinbelow, a preferred embodiment of the invention will be explained in detail with reference to the drawings.

Referring to FIGS. 1–16, a disk cartridge according to the invention includes a disk type recording medium 201 a cartridge casing 11, comprised of upper and lower shells 12, 13 for rotatably accomodating the disk 201. A shutter 21 is slidably provided on one edge of the cartridge casing 11 so as to be slidably movable to open and close an aperture 14 formed in the cartridge casing for facilitating read/write operations by a disk drive (not shown) or the like. The upper and lower shells include recessed slide surface portion 12a, 13a formed on corresponding sides thereof for defining a slide area is of the shutter 21 which is mounted astride the upper and lower slide surfaces 12a, 13a.

The slider area 15 is bordered by side wall portions 15a and 15b. As may be seen in FIG. 2, a guide member 23b attached to the bottom surface of the lower shell 13 via screws or the like.

The shutter is a substantially C-shaped arrangement having a lower surface 21b for covering the lower aperture 14, an upper surface 21a for covering the upper aperture 14 and a connecting side wall portion 21c. The shutter is biased in a closed position by a shutter spring 24 so as to normally cover apertures 14 provided in upper and lower shells 12, 13 at a location within the the upper and lower slide surface portions 12a, 13a. For this purpose the shutter is attached to a slider member 23 via screws 22, 22 which attach to the slider member 23 via holes provided in the side wall portion 21c of the shutter. The lower aperture 14 of the lower shell 13 is formed with an elongate U-shape for facilitating engagement between a hub portion of the disk 201 and a turntable (not shown) of the disk drive.

Figure 1:
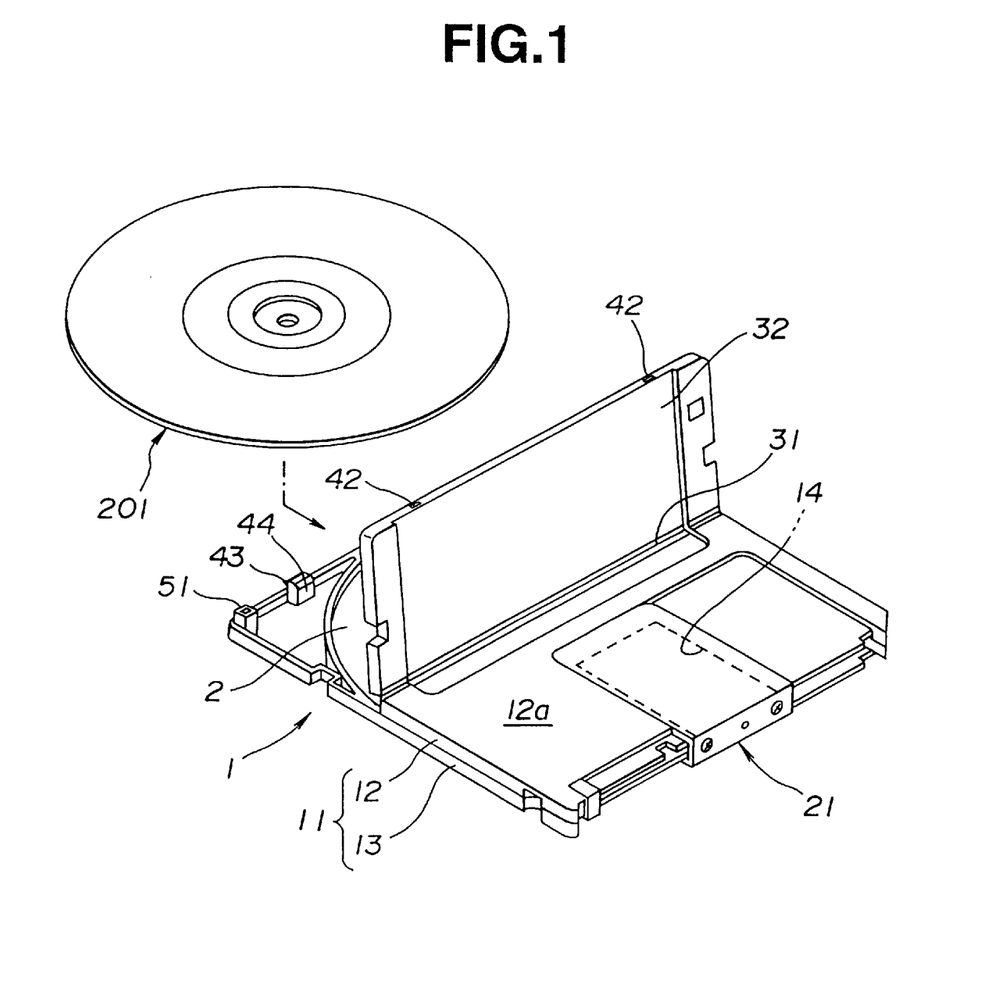
FIG. 1 is a perspective view of a disk cartridge according to a preferred embodiment of the invention.
Figure 2:
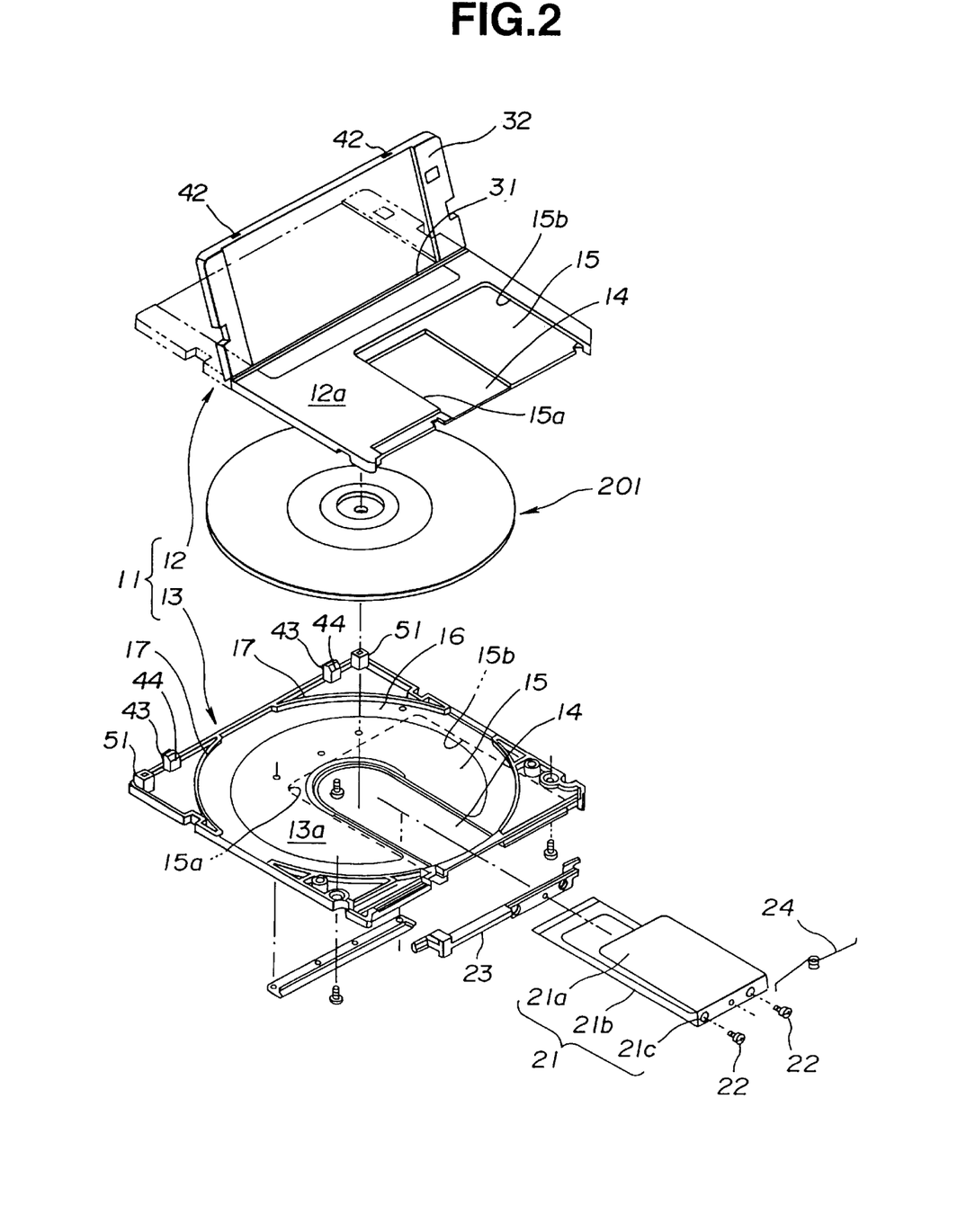
FIG. 2 is an exploded perspective view of the disk cartridge of FIG. 1.

Further, as will be seen in FIG. 2, a disk receiving compartment 16 is defined on the inner surfaces of the upper and lower shells 12, 13 which is bordered by curved wall portions 17 for defining a substantially circular disk operating space.

Figure 3:
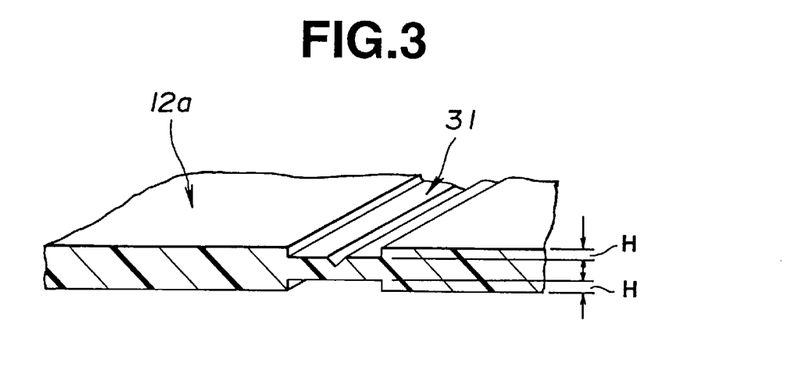
FIG. 3 shows a cut away perspective view of a hinge portion of the cartridge casing according to the invention.
Figure 4:
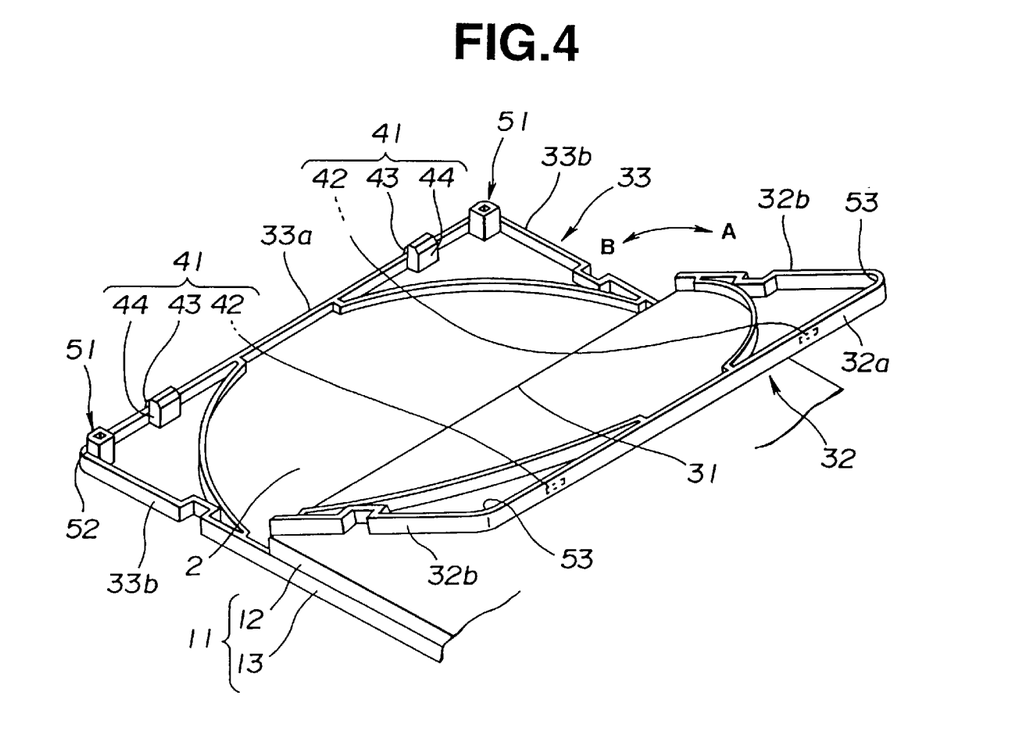
FIG. 4 is a is a perspective view of a major portion of the cartridge casing according to the preferred embodiment.

Next, referring to FIGS. 2–4, a hinge portion of the disk cartridge of the invention will be described in detail hereinbelow. As may be seen, the hinge is integrally formed with the upper shell 12 and is defined by a recessed portion extending laterally across the upper surface of the upper shell and further including a V-shaped groove defined in the recessed portion for establishing a bending edge of the hinge. For this purpose it is preferable to utilize a flexible synthetic resin for the upper shell. Although, according to the invention, a substantially rigid material may be utilized for the lower shell 13 so as to provide additional mechanical strength to the disk cartridge. Optionally however, flexible resin material may be utilized for both of the upper and lower shells 12, 13.

The upper shell includes vertical side wall portions 32 at a periphery thereof while the lower shell 13 includes side wall portions 33 therearound. The upper side wall portions 32 meet at corner sections 53 while the lower side wall portions meet at corner sections 52. At the outer side of the cartridge casing from which the cover member 32 opens, posts 51, 51 are vertically projected to securely hold the cover member 32 in position when closed.

Figure 5:
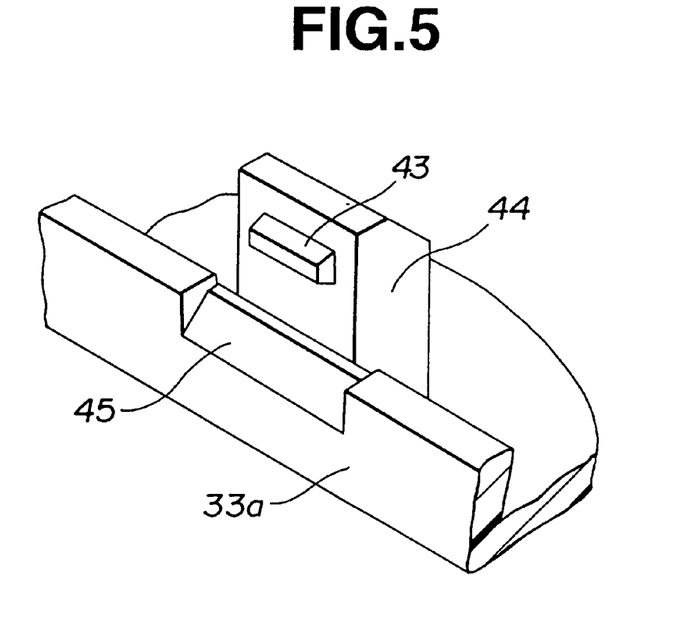
FIG. 5 shows a perspective view of a lock portion of the disk cartridge casing.

Locking means 41 is provided in the form of locking members 44 projected vertically from an inner surface of the lower shell 13. Specifically, the pair of locking members 44, 44 include projections 43 facing in the outer direction of the disk cartridge casing 11 which engage corresponding recesses 42 formed in the inner side wall 32a of the cover portion 32 of the upper shell 12.

Figure 6:
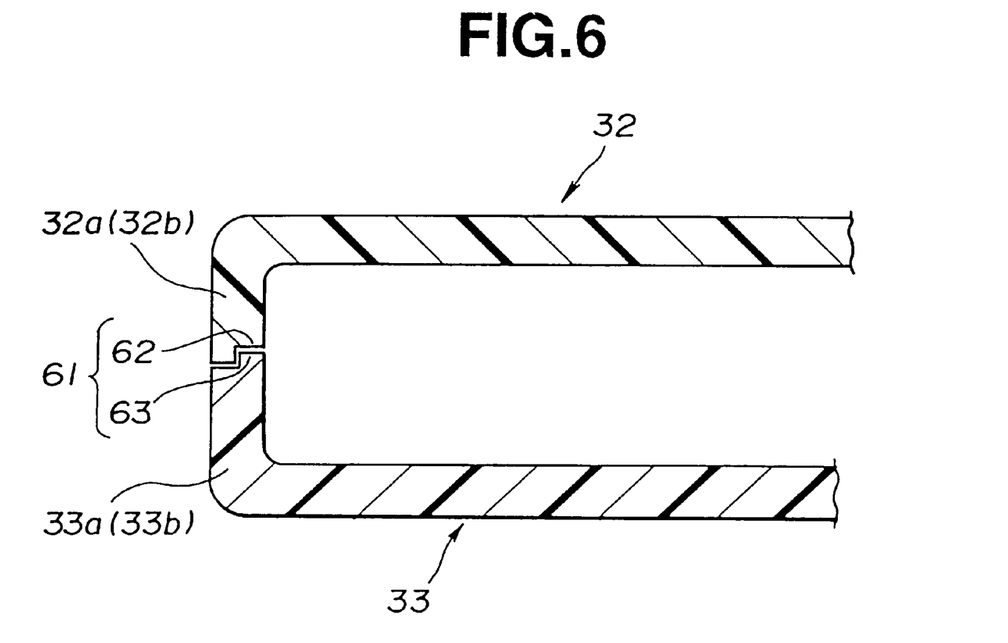
FIG. 6 is a cross-sectional side view showing interlocking arrangement of upper and lower shell portions of the cartridge casing.

Further, referring to FIG. 6, it may be seen that an upper side of each of the side wall portions 32, 33 of the upper and lower shells 12, 13 include engaging means 61 formed as a reduced thickness wall portion 63 formed in one of the upper or lower shells 12, 13 and a corresponding peripheral recess 62 formed in the other shell 12, 13 such that the upper and lower wall portions 32, 33 stably interlock for adding additional mechanical strength to the cartridges structure. Also, as the hinge 31 is provided such that the cover member 32 comprises substantially one third to one half of the area of the upper shell 12, the area of the disk opening available in an open condition of the cover member 32 is substantially large. Thus, a disk 201 may easily and safely removed from and/or inserted into the cartridge.

Figure 11:
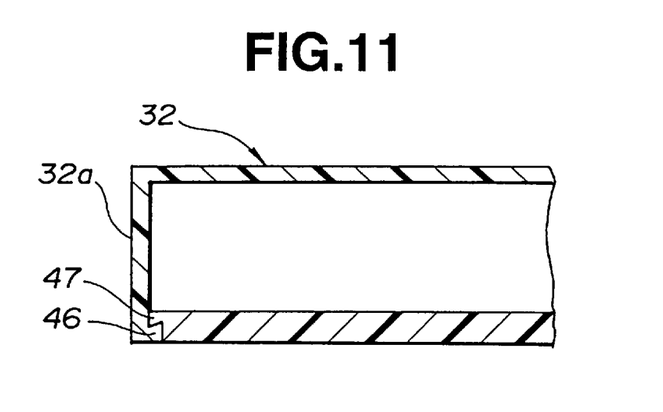
FIG. 11 shows a cross-sectional view showing interlocking engagement of the upper and lower shell portions of the cartridge casing according to an alternative construction of the invention.
Figure 15:
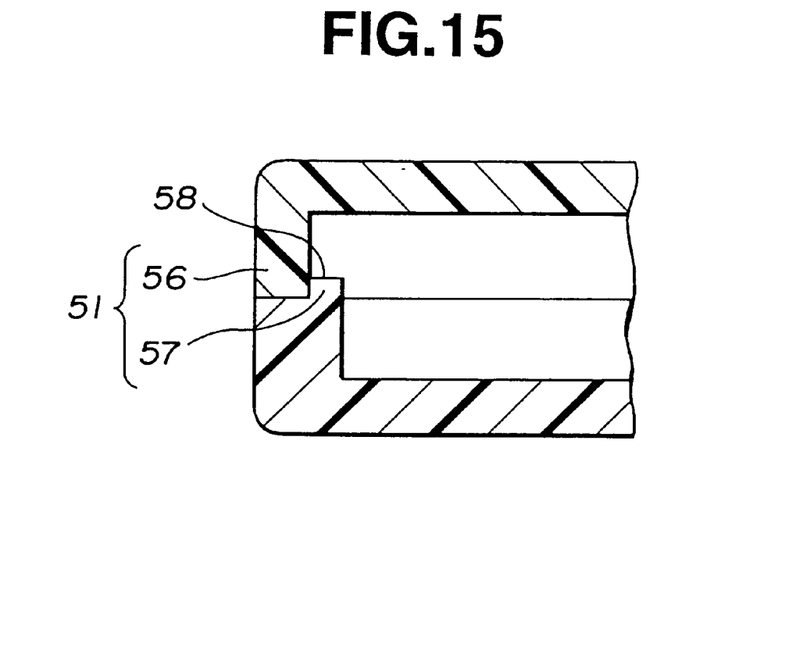
FIG. 15 shows another embodiment of an interlocking arrangement of the upper and lower shell portions of the cartridge casing.
Figure 16:
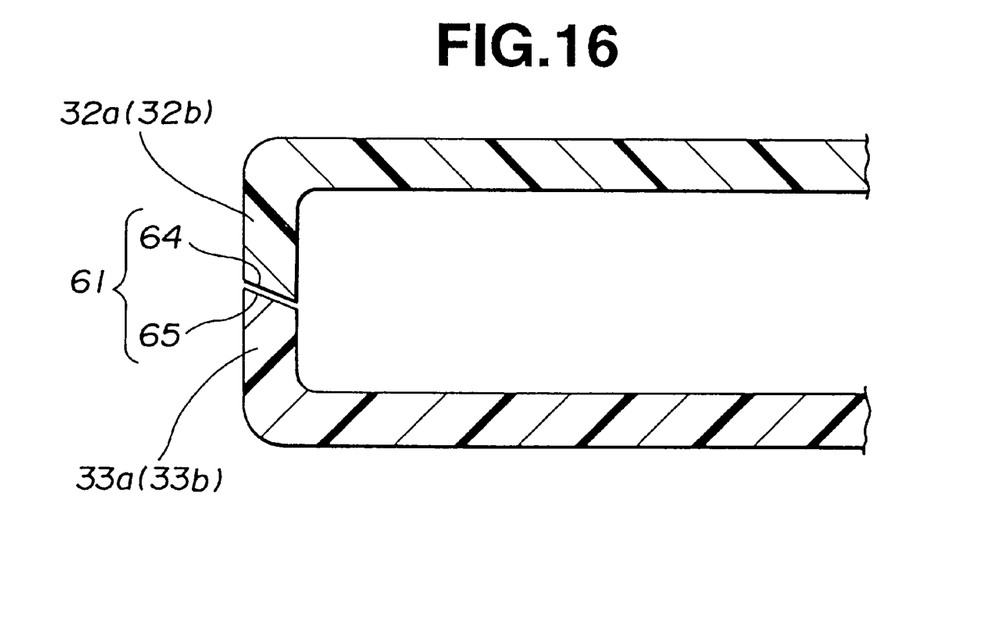
FIG. 16 illustrates yet another alternative interlocking arrangement of upper and lower shell portions of the cartridge casing.

FIGS. 11, 15 and 16 show alternative structures for joining side wall portions 32, 33 of the cartridge casing for increasing structural integrity. FIG. 11 shows opposed corresponding projections 48, 47 having slanted sides and allowing the opening edge of the cover member 32 to interlock with a substantially flat lower shell 13 which may be easily and inexpensively manufactured.

FIGS. 15 and 16 show joining portions 51 and 61 respectively. FIG. 15 shows a method substantially the same as that of FIG. 6 while FIG. 16 shows a simplified structure in which correspondingly slanted edge surfaces of the side walls are contacted for stable but simply achieved engagement. The joining portions 51 and 61 may apply to the modifications of FIG. 12, for example wherein the posts 51 for securing the cover member 32 are positioned inwardly of the corner portions of the shells 12, 13.

Figure 12:
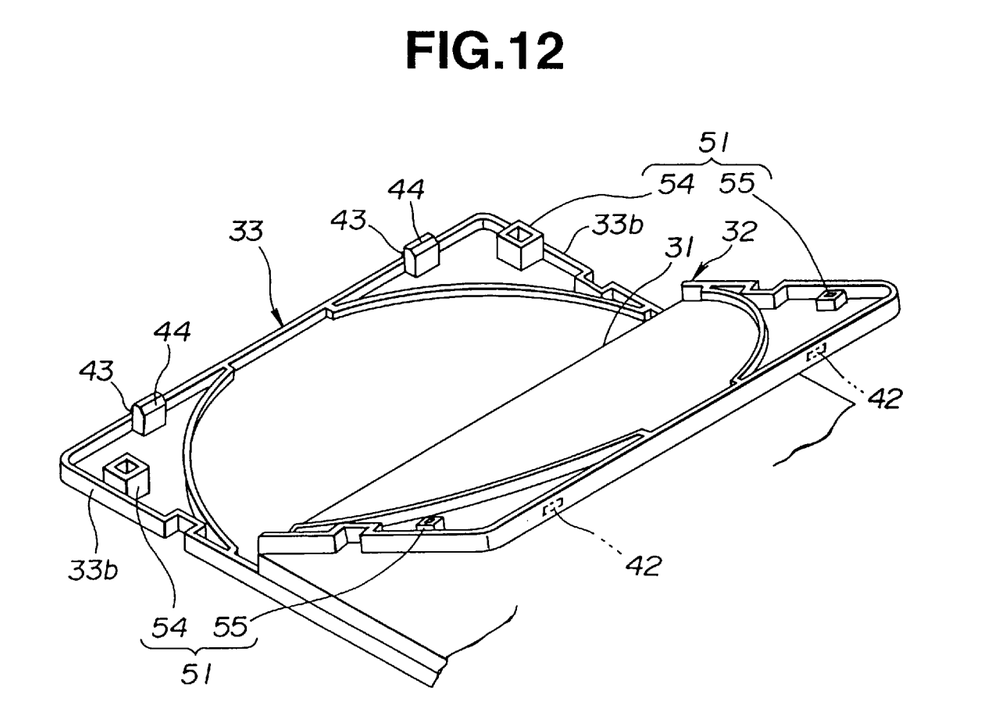
FIG. 12 is a is a perspective view of an alternative arrangement of a cover portion of the cartridge casing.
Figure 13:
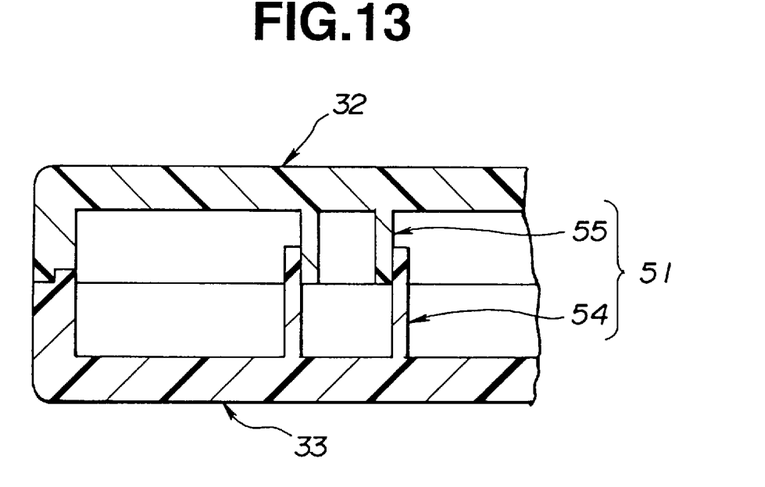
FIG. 13 illustrates an alternative embodiment of an interlocking structure of the upper and lower shell portions of the cartridge casing.
Figure 14:
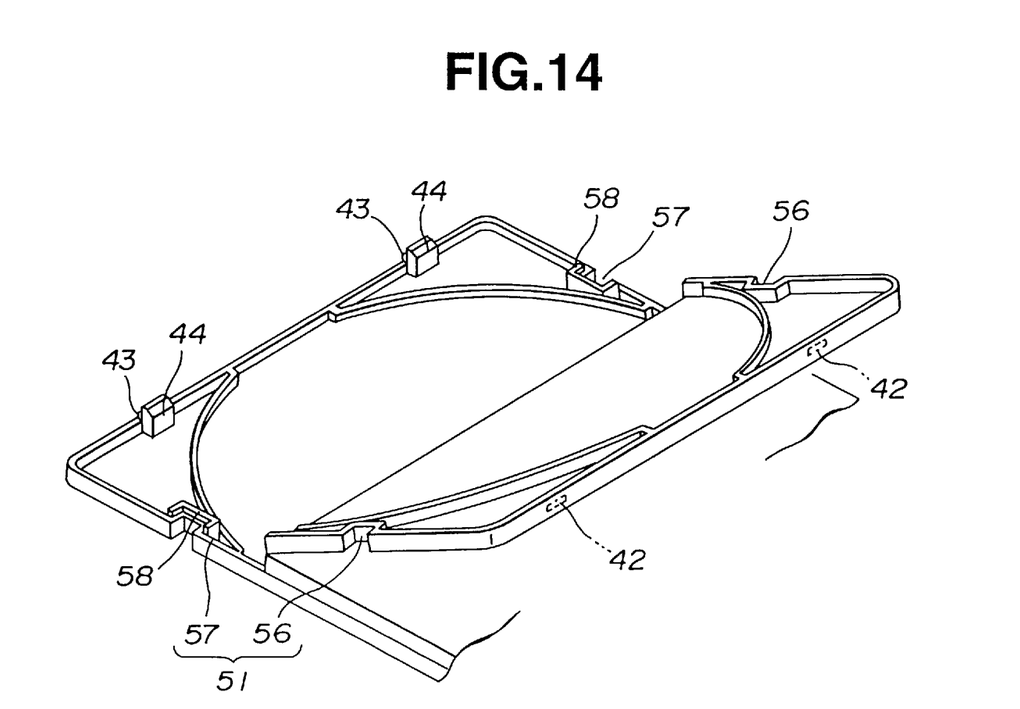
FIG. 14 is a cover portion of the cartridge casing in an open condition according to the alternative embodiment.

Further, as seen in FIG. 12 and 13, increased engaging strength is achieved according to the structure of the posts by including a larger hollow post 54 projected from the lower shell 13 and interlocking with a smaller post 55 projected from the upper shell 12.

Figure 7:
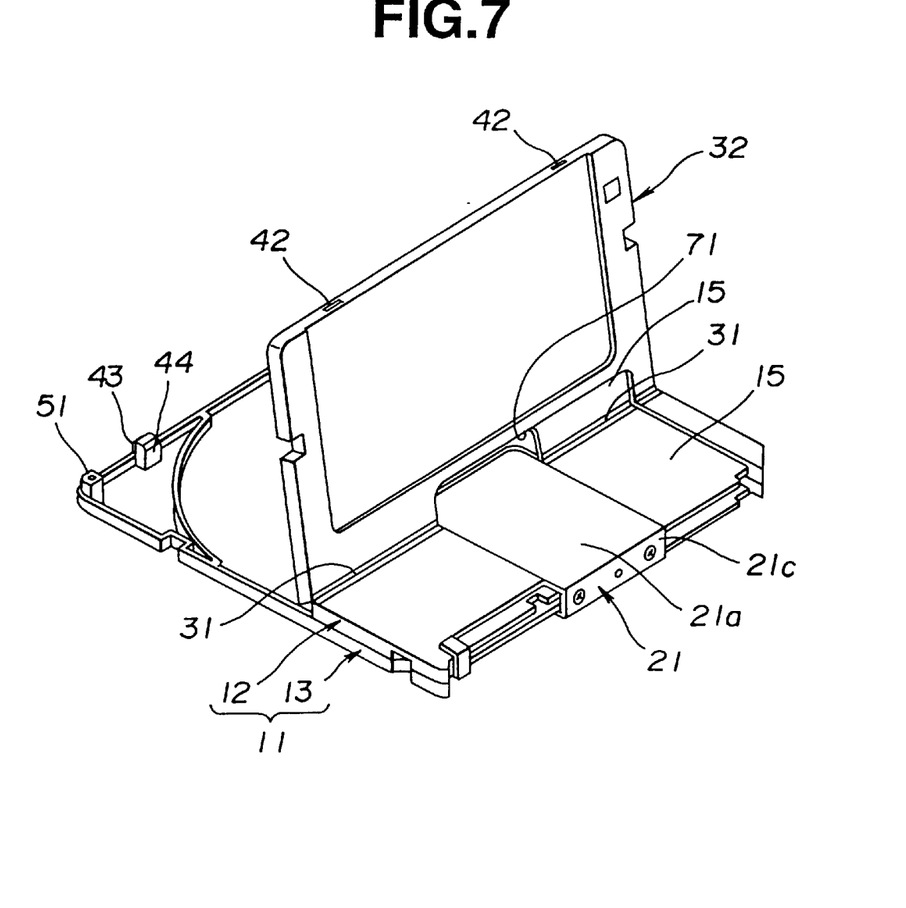
FIG. 7 shows a is a perspective view of a cartridge casing according to a second preferred embodiment of the invention.
Figure 8:
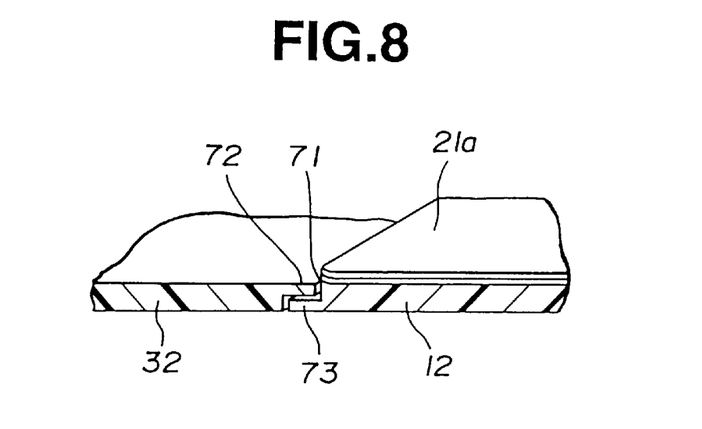
FIG. 8 is a is a cut away perspective view of a main portion of the cartridge casing according to the second embodiment.

FIGS. 7–8 show an alternative embodiment of the disk cartridge of the invention. As with the above described first embodiment, the disk cartridge according to the invention includes a disk 201 a cartridge casing 11 comprised of upper and lower shells 12, 13 rotatably accomodating the disk 201 with a shutter 21 slidably provided on one edge of the cartridge casing 11 and movable to open and close apertures 14 formed in the cartridge casing for facilitating operation. The upper and lower shells include recessed slide surface portions 12a, 13a formed on corresponding sides thereof for defining a slide area 15 of the shutter 21 which is mounted astride the upper and lower slide surfaces 12a, 13a.

The shutter C-shaped shutter includes a lower plate 21b for covering the lower aperture 14, an upper plate 21a for covering the upper aperture 14 and a connecting side wall portion 21c. The shutter is biased in a closed position by a shutter spring 24 so as to normally cover apertures 14 provided in upper and lower shells 12, 13 at a location within the the upper and lower slide surface portions 12a, 13a. The shutter is likewise attached to a slider member 23 via holes provided in the side wall portion 21c.

A disk receiving compartment 16 is defined on the inner surfaces of the upper and lower shells 12, 13 which is bordered by curved wall portions 17 for defining a substantially circular disk operating space.

However, according to the present modification, the cover member 32 is made larger so as to encompass a central portion of the slider area. Thus, as seen in FIG. 8, the wall portion 71 of the upper shell 12 which borders the edge of the cover portion 32 along the edge of the shutter 21 is formed with a projecting reduced thickness portion 73 which corresponds to a recess 72 formed in the facing edge of the cover member 32. Thus, even while a greater opening is provided for disk access in an open condition of the cover member 32, the stability and mechanical strength of the disk cartridge structure is maintained when the cover member 32 is closed.

Figure 9:
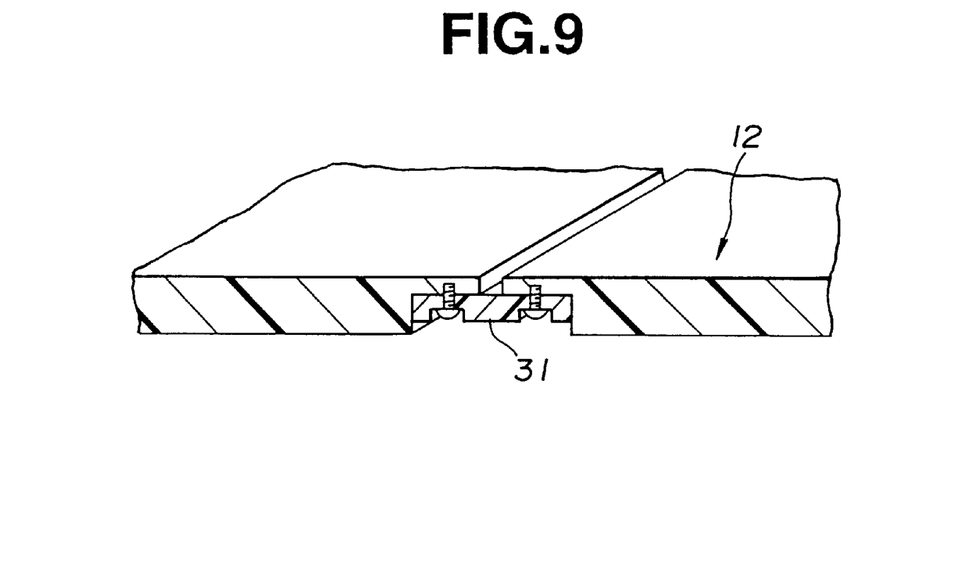
FIG. 9 is an enlarged prespective view of an alternative arrangement of a hinge portion of the cartridge casing according to the invention.
Figure 10:
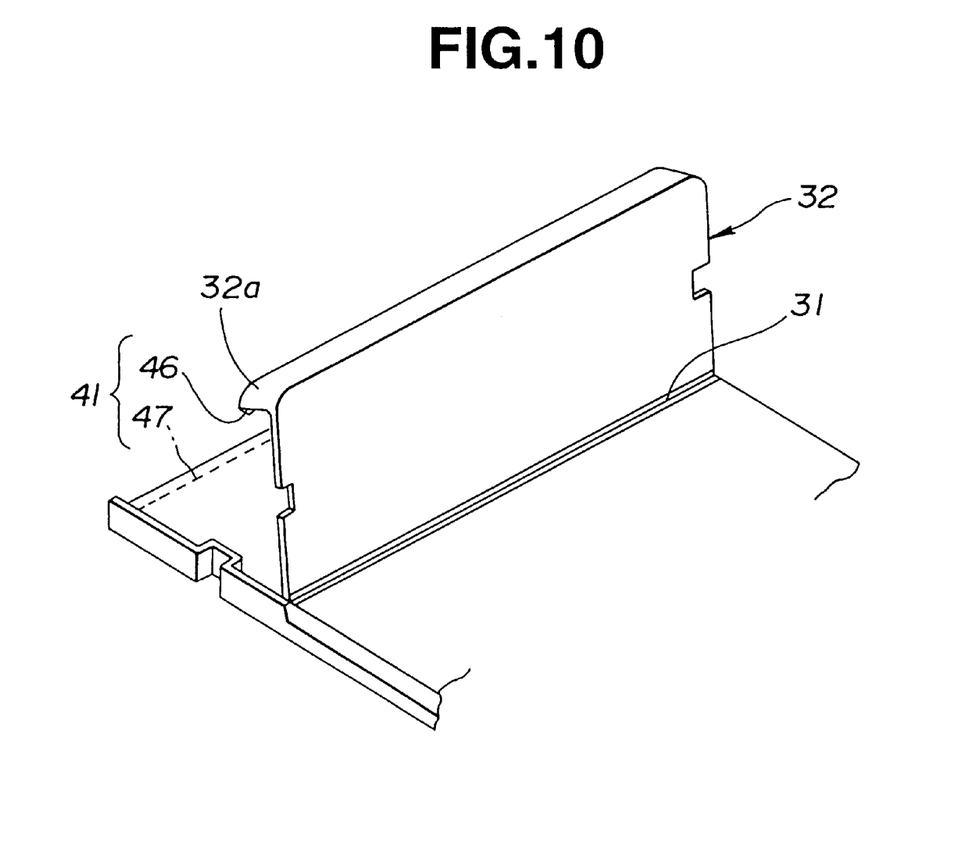
FIG. 10 is a is a perspective view of a cover portion of the cartridge casing in an open condition.

FIGS. 9–10 show a further alternative modification of the disk cartridge structure of the invention. As seen in FIG. 9, the hinge is formed by attaching a flexible hinge members 31 to a lower side of a two part structure forming the upper shell. The hinge 31 may be attached via screws or the like. According to this, a substantially rigid material may be utilized for both the upper and lower shells for increased strength. Further, the locking means may be incorporated into corner portions 46of the cover member 32 thus simplifying the overall structure.

In a structure such as shown in FIG. 12, the hinge may be provided as two separate components on each side of that portion of the edge of the cover member which is cut out to allow positioning of the shutter.

Thus, according to the present invention as described herein above, there is provided a disk cartridge structure having a cover portion which is openable and closable such that a data disk may be easily removed from and installed into the cartridge.

Further, the data disk may be easily inserted into the cartridge in such a manner that correct mounting of the installed disk and reliable disk operational performance is reliably achieved.

Further, according to the structure of the invention as herein set forth, a data disk cartridge having a simplified structure is provided which may be reliably manufactured and assembled at comparatively low cost.

It will be noted that, although the preferred embodiment is set forth in terms of a data disk cartridge, the present invention may be embodied in various different ways for a variety of rotatable disk mounting applications without departing from the principle of the invention as herein set forth.

The present invention in not limited only to the description as herein disclosed but may be modified and embodied in other ways without departing from the scope or inventive concept of the invention as set forth above.

What is claimed is:

1. A disk cartridge, comprising:

an upper casing shell;

a lower casing shell, said upper and lower casing shells being attached at edge portions thereof so as to form a cartridge casing having a first opening defined therein by which a disk may be inserted into an operating position within said casing, said upper shell including vertical upper side wall portions at the periphery thereof and said lower shell including vertical lower side wall portions at the periphery thereof, said upper side wall portions being joined at first corner sections and said lower side wall portions being joined at second corner sections wherein an upper end of each of the vertical side wall portions of said upper and lower casing shells including non-locking engaging means formed in one of said upper and lower casing shells and a peripheral recess formed in the vertical side wall of the other said shell wherein said non-locking engaging means and said peripheral recess are of uniform cross-section throughout said respective shell vertical side wall;

a slide area defined in an outer peripheral portion of said upper and lower shell portions of said casing;

a second opening defined between said upper and lower shell portions within said slide area;

a shutter portion disposed at an edge of said casing at said slide area, said shutter portion being slidably movable within said slide area so as to open and close said second opening;

a cover member including a single, continuous hinge portion provided on at least one of said upper and lower shell portions and being defined by a recessed portion extending laterally from one side wall portion of the respective shell portion to the other side wall portion thereof and further including a V-shaped groove defined in the recessed portion for establishing a bending edge of the hinge portion so as to expose said first opening in an open position thereof, and to cover said first opening in a closed position thereof;

locking means provided on the other of said first and second shell portions for providing opening and closing movement of said cover member, said locking means including a pair of locking members projecting vertically from an inner surface of the other of said upper and lower shell portions, each of said pair of locking members including a projection member facing outwardly of said disk cartridge casing which engage corresponding recesses formed in an inner side wall of said cover member so as to cooperate with said engaging means to stably interlock said upper and lower casing shells; and wherein said cover member, said hinge portion and said respective one of said upper and lower shell portions on which said cover member is provided are integrally formed.

2. A disk cartridge as set forth in claim 1, wherein said hinge is defined at an outer side of said slide area of said cartridge casing.

3. A disk cartridge as set forth in claim 1, wherein one of said upper and lower shell portions is provided with a flexible first plate disposed on an inner side thereof and the other of said upper and lower shell portions is provided with a non-flexible second plate portion on an inner side thereof so as to oppose said flexible plate portion within said cartridge casing.

4. A disk cartridge as set forth in claim 3, wherein either or both of said first and second plates are formed of synthetic resin.

5. A disk cartridge as set forth in claim 1, wherein said hinge is formed as a reduced thickness portion of a predetermined portion of casing of said disk cartridge.

6. A disk cartridge as set forth in claim 5, wherein an edge along which said hinge joins said casing is defined as a concave area along a surface portion of at least one of said upper and lower shell portions of said casing.

7. A disk cartridge as set forth in claim 1, wherein said half of said one of said upper and lower shell portions including said cover portion further includes position determining means for defining a range of pivotal movement of said cover portion.

8. A disk cartridge as set forth in claim 5, wherein said other of said upper and lower shell portions engaging said one of said upper and lower shell portions which includes said cover portion is formed with an edge portion thereof having reduced thickness in relation to said shell portion on which said cover portion is formed.

9. A disk cartridge, comprising:

an upper casing shell including vertical upper side wall portions at the periphery thereof with said upper side wall portions being joined at first corner sections;

a lower casing shell including vertical lower side wall portions at the periphery thereof with said lower side wall portions being joined at second corner sections, said upper and lower casing shells being attached at edge portions thereof so as to form a cartridge casing having a hollow space defined therebetween configured for rotatably mounting a disk therein wherein an upper end of each of the vertical side wall portions of said upper and lower casing shells includes non-locking engaging means formed in one of said upper and lower casing shells and a periphery recess formed in the vertical side wall of the other of said shells wherein said non-locking engaging means and said peripheral recess are of uniform cross-section throughout said respective shell vertical side wall;

a recessed slide area defined in an outer peripheral portion of said upper and lower casing shells;

a disk access opening formed within said slide area in at least one of said upper and lower shells;

a slidably disposed shutter disposed astride a peripheral edge of said cartridge casing within said slide area, said shutter portion being slidably movable so as to open and close said second opening according to disk operation;

a cover member including a single, continuous hinge, disposed on at least one of said upper and lower shells and being defined by a recessed portion extending laterally from one side wall portion of the respective shell to the other side wall portion thereof and further including a V-shaped groove defined in the recessed portion for establishing a bending edge of the hinge portion so as to open or close said cartridge casing for allowing access to said hollow space;

locking means providing on the other of said first and second shell portions for providing opening and closing movement of said cover member, said locking means including a pair of locking members projecting vertically from an inner surface of the other of said upper and lower shell portions, each of said pair of locking members including a projection member facing outwardly of said disk cartridge casing which engage corresponding recesses formed in an inner side wall of said cover member so as to cooperate with said engaging means to stably interlock said upper and lower casing shells;

a data disk which may be inserted into or removed from said cartridge casing in an open condition of said cover member and so configured as to be rotatably seated within said hollow space defined between said upper and lower shells in a closed condition of said cover member; and wherein said cover member, said hinge and said respective one of said upper and lower shells on which said cover member is provided are integrally formed.

10. A disk cartridge as set forth in claim 9, further including locking means associated with said cover member such that said cover member is securely locked in a closed condition thereof.

11. A disk cartridge as set forth in claim 9, wherein said hinge is defined at an outer side of said slide area of said cartridge casing.

12. A disk cartridge as set forth in claim 9, wherein one of said upper and lower shells is provided with a flexible first plate disposed on an inner side thereof and the other of said upper and lower shells is provided with a non-flexible second plate portion on an inner side thereof so as to oppose said flexible plate portion within said cartridge casing.

13. A disk cartridge as set forth in claim 12, wherein either or both of said first and second plates are formed of synthetic resin.

14. A disk cartridge as set forth in claim 9, wherein said hinge is formed as a reduced thickness portion of a predetermined portion of casing of said disk cartridge.

15. A disk cartridge as set forth in claim 14, wherein an edge along which said hinge joins said casing is defined as a concave area along a surface portion of at least one of said upper and lower shells of said casing.

16. A disk cartridge as set forth in claim 9, wherein said half of said one of said upper and lower shells including said cover portion further includes position determining means for defining a range of pivotal movement of said cover portion.

17. A disk cartridge as set forth in claim 14, wherein said other of said upper and lower shells engaging said one of said upper and lower shells which includes said cover portion is formed with an edge portion thereof having reduced thickness in relation to said shell on which said cover portion is formed.

18. A disk cartridge as set forth in claim 9, in which said cover portion comprises at least one third of a surface area of said upper shell.

19. A disk cartridge as set forth in claim 9, in which said cover portion comprises substantially one half of a surface area of said upper shell and said overlaps a portion of said slider area.

20. A disk cartridge as set forth in claim 19, in which said hinge is provided as two separate components on each side of an edge of said cover portion attached to said hinge, a central portion thereof including a cut out for accomodating said shutter.

* * * * *